---

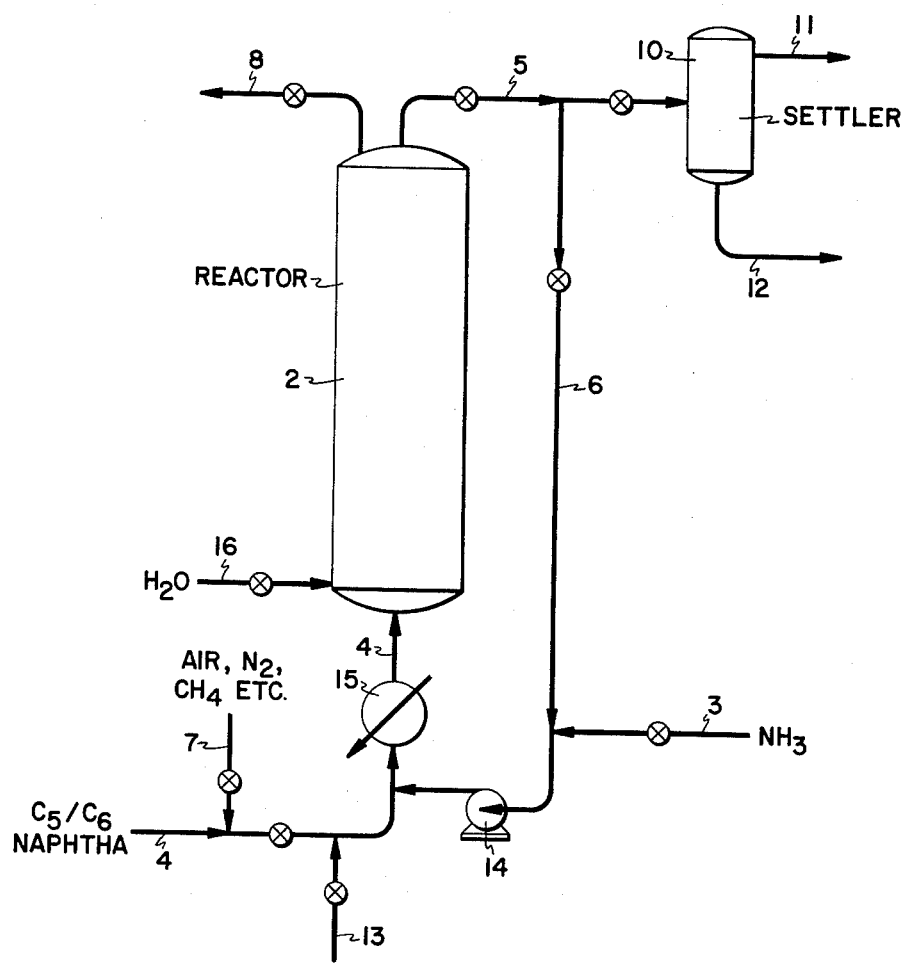
Richard F. Stringer
Julius P. Bilisoly   Inventors
By Richard W. Nagel
Patent Attorney – # United States Patent Office 3,121,695
Patented Feb. 18, 1964

3,121,695
REGENERATION OF SPENT FRIEDEL-CRAFTS CATALYST
Richard Franklin Stringer and Julius Philip Bilisoly, Baton Rouge, La., assignors to Esso Research and Engineering Company, a corporation of Delaware
Filed Aug. 29, 1960, Ser. No. 52,678
5 Claims. (Cl. 252—420)

The present invention relates to the use of of Friedel-Crafts type catalysts, such as anhydrous aluminum chloride and bromide, for isomerizing, polymerizing, alkylating, and otherwise beneficiating hydrocarbons. More particularly, the present invention relates to the recovery and reactivation of supported Friedel-Crafts catalyst spent in the reaction. Furthermore, the present invention relates to the removal of impurities from and the recovery of support material which may be reused with a Friedel-Crafts catalyst.

In well-known processes, such as paraffin isomerization, in which aluminum halide catalysts, such as aluminum bromide or aluminum chloride, are used in conjunction with a support, such as bauxite, alumina, clays, and the like, the catalyst gradually becomes deactivated with use and must be replaced. It is theorized that during the reaction the aluminum halide becomes complexed with hydrocarbon and is thus rendered ineffective for the intended purpose. It is clear that the spent catalyst does not contain aluminum halide in its original form, since paraffin conversion ceases and hydrocarbon washing will not remove the aluminum halide therefrom, though pure aluminum halide is quite soluble in hydrocarbons. For the sake of clarity the aluminum halide in the spent catalyst will be referred to as "the aluminum halide-hydrocarbon complex," it being understood that the actual form of the spent aluminum halide on the support is immaterial to the instant invention.

In any event, the mass of support and aluminum halide-hydrocarbon complex presents problems whether one is discarding it or attempting to recover the support therefrom. The fouled catalyst mass is extremely corrosive and if dumped will cause air contamination for exposure to air and moisture results in the liberation of toxic hydrogen halide. Disposal by dumping in water further creates a pollution and safety problem because of the evolution of HBr or HCl during the hydrolysis and the gelatinous nature of the aluminum hydroxide. One method which has been partially successful in solving the problem consists of contacting the spent catalyst with anhydrous ammonia and subsequently water. It has been found that this permits discarding the support without causing air or water pollution problems and furthermore provides some recovery of aluminum halide. However, this process fails to recover an impurity-free support and more particularly a support which may be reused with the Friedel-Crafts catalyst.

It is one of the objects of this invention to provide a method of recovering from a spent supported Friedel-Crafts type catalyst the support material so that it may be reused in the reaction.

It is still a further object to provide a method whereby the above may be accomplished in situ, thus saving time and labor in discharging and reloading fixed bed reactors.

Further objects and advantages of the instant invention will become more apparent from the following description.

In accordance with the present invention, it has been found that support material from the spent supported Friedel-Crafts catalyst may be recovered by: (1) contacting said spent catalyst with anhydrous ammonia, (2) water washing said ammonia-neutralized catalyst support, and (3) drying said washed catalyst at temperature in the range of about 600° to 1000° F., preferably 700°–1000° F., for complete reactivation.

As discussed hereinbefore, it is known that anhydrous ammonia neutralizes the catalyst mass. It has been thought that it reacts with the aluminum halide-hydrocarbon complex to form a neutral ammonia-aluminum halide-hydrocarbon complex. Though the actual reaction product is not material to the invention, for clarity the ammonia neutralized material will be referred to as an "ammonia-aluminum halide-hydrocarbon complex." Water washing has been found to hydrolyze this complex causing its breakdown and release from the support. The critical drying step of the instant invention removes the water and any residual oil and aluminum hydroxide remaining on the support and thereby reactivates the support for reuse in the reaction zone as support for the Friedel-Crafts catalyst.

The drawing depicts a suitable system in which the processes of the invention are carried out.

Referring now to the drawing, the invention will be more fully explained as applied to the aluminum bromide isomerization of a light virgin $C_5/C_6$ naphtha to a high octane motor fuel. Reactor 2 is packed with a support, preferably alumina or a calcined bauxite ("Porocel"), and a stream of $C_5/C_6$ naphtha containing 0.1 to 10 wt. percent dissolved aluminum bromide is passed over the bed at a temperature of about 80° to 300° F. Hydrogen bromide is used as a reaction activator. Aluminum bromide is deposited upon the support until it comprises 10 to 75 wt. percent of the total catalyst mass, and a substantial equilibrium is attained. Gradually the conversion to isomers, which in the case of $C_6$ paraffins may go up to 92% isohexanes based on paraffinc hexanes, decreases due to the catalyst deactivation referred to above. Regeneration of the bed is then necessary.

Regeneration of the catalyst bed is initiated by recovering the hydrogen bromide in the bed by passing fresh feed via line 4, or recycle isomerized product by lines 13 and 4, through the catalyst bed. Where the isomerized product has any hydrogen bromide therein, it must be removed prior to its use as a wash.

After stripping to remove hydrogen bromide, anhydrous ammoni ais passed into vessel 2 through lines 3, 6 and 4. The reaction of ammonia and aluminum bromide-hydrocarbon complex on the support is extremely exothermic, e.g., to the extent of about 140 calories per gram of total catalyst when said catalyst contained 36 wt. percent $AlBr_3$ based on weight of Porocel support. This large heat release may require special temperature control. The anhydrous ammonia may be withdrawn by line 8.

The preferred technique for controlling temperature during the ammonia neutralization step is to circulate naphtha by means of lines 5 and 6, pump 14 and line 4 through an inter-stage cooler 15 normally used in the isomerization step. The naphtha may be supplied by line 4. The naphtha circulation rate and naphtha temperature is controlled so that temperatures in reaction zone 2 during ammonia neutralization are maintained below about 300° F. Anhydrous ammonia in amounts of 1 to 10 wt. percent is blended into the circulating naphtha stream using stoichiometric amounts for complete neutralization of the aluminum bromide-hydrocarbon complex.

After ammonia neutralization, the reactor is purged by gas entering from lines 7 and 4 and being removed therefrom through line 8. Gases, such as air, nitrogen, methane and the like, are suitable. This serves to remove the last traces of ammonia and naphtha. If preferred, the gases may be heated to aid in vaporization of the naphtha and anhydrous ammonia remaining in the reactor.

The ammonia neutralized catalyst is hydrolyzed with water entering line 16 to remove from the support the ammonia-aluminum halide-hydrocarbon complex. The water, which may be at a temperature in the range of about 50 to 150° F., appears to break the complex into $NH_4Br$, an aluminum hydroxide in gel form (which suspends in the water) and a small quantity of hydrocarbon oil. The aqueous mixture of these fragmentary products leaves the reactor through line 5 and is directed thereby to settler 10 wherein the hydrocarbon oil is separated from the aqueous mixture of $NH_4Br$ and aluminum hydroxide gel. The hydrocarbon oil phase is withdrawn through line 11. The aqueous mixture is withdrawn by line 12 for treatment discussed in more detail hereinafter. Water washing is continued until aluminum hydroxide has been essentially removed from the support, which may be determined by a visual inspection of clarity of the wash water. A minimum of three volumes of wash water per volume of catalyst is necessary for efficient washing.

Ammonia neutralization prior to water washing is necessary for two reasons. First, the ammonia-aluminum halide-hydrocarbon complex has a pH of about 7-8 in aqueous solution and thus does not promote corrosion. Corrosion rates of this solution on carbon steel are very low, e.g., about 1.4 mils/year. On the other hand, directly water washing the spent supported aluminum bromide catalyst causes excessive corrosion because of the formation of hot aqueous HBr. Corrosion rates of aqueous HBr on carbon steel in excess of 500 mils/year are well known. Secondly, the combination sequence of ammonia neutralization and water washing is more effective in cleaning the support surface than water washing alone.

Catalyst wash rate must be controlled for two reasons. First, the wash rate must be sufficiently low to avoid loss of support due to entrainment of the smaller support particles and to avoid attrition. Secondly, the wash rate must be sufficiently high during the initial part of the washing to avoid formation of highly concentrated aluminum hydroxide gel. This concentrated gel, because of its high viscosity, entrains large particles of support from the bed and would carry them from the reactor.

The washed support is then dried at temperatures in the range of about 600°–1000° F. by passing a heated gas over the support by means of lines 7 and 4. The gas is withdrawn by line 8. The gas may be any inert gas, such as nitrogen, carbon dioxide, etc., air or even flue gas from the combustion of hydrocarbons with air. Drying with gases at temperatures in the range of about 600°–1000° F. is continued until the water content of the effluent gas leaving the reactor by line 8 is equivalent to the water content of the gas entering vessel 2. It has been established that the washed support must be dried to a low water content before reuse in the isomerization process and operation within this drying temperature range effects this result.

Upon completion of the drying step, the support may then be again saturated with $AlBr_3$ by contacting said support with a hydrocarbon stream containing dissolved aluminum bromide. Of course, hydrogen bromide may also be present in the hydrocarbon solution. The hydrocarbon conversion process may then proceed again.

It is clear that the use of this inventive process eliminates the necessity of frequent charging and discharging of the catalyst and reduces the catalyst operation cost, since the same support may be used over and over again.

As by-products of the instant process, stream 12 may be treated in a variety of manners to recover therefrom constituents which may be reused in the instant process. For example, the aqueous solution of $NH_4Br$ and suspended aluminum hydroxide may be evaporated or spray dried to give the solid halogen salts which may be used for many purposes, e.g., they may be converted into HBr by treatment with an inorganic acid, such as $H_2SO_4$. The HBr may be used to react with aluminum metal and form aluminum bromide for reuse in the catalyst system.

An alternate procedure involves treatment of the $NH_4Br$ solution with elemental chlorine, which liberates free elemental bromine from the solution. This bromine may be used to form aluminum bromide by reaction with aluminum.

The following examples illustrate various aspects of the instant invention.

Example I

Two reactors containing $AlBr_3$-Porocel catalyst (of 10–20 mesh particle size) which had been employed in the isomerization of $C_5/C_6$ naphtha were removed from isomerization service and the Porocel supports in the two reactors were regenerated. These reactors were the same size, contained the same amount of catalyst and were employed under the same isomerization conditions. The regeneration of the support was accomplished by ammonia neutralization, water washing and drying. Different wash rates were employed for each reactor with the following results:

|  | Reactor E | Reactor F |
|---|---|---|
| Wash Rate, Velocity in ft./min | 1.0 | 0.5 |
| Porocel Support Losses by Entrainment, percent of Total | 40 | 12 |

It may be seen from the above data that the wash rate of 0.5 ft./min. decreases the loss of Porocel support by entrainment more than three-fold.

In other experiments of the same type it has been found that if much lower than 0.2 ft./min. water velocity is employed for washing, the concentration of viscous aluminum hydroxide gel becomes sufficiently great in the initial wash water so that excessive entrainment of particles occur. At low water rates the aluminum hydroxide gel formed in the pores of the support leaches out sufficiently rapid to make a concentrated gel in the mass of water flowing over the particles. This gel entrains the support particles. At higher water rates, the rate of leaching out of the aluminum hydroxide gel is probably unchanged, but a greater mass rate of water is flowing over the particles. Thus, concentration of the gel in the flowing water is lower. However, a water wash rate maximum of 0.5 ft./min. is preferred to avoid attrition and entrainment of particles by the water during the entire wash step.

Example II

This example demonstrates the effect of residual water content of the support on catalyst activity for isomerization and on the quantity of $AlBr_3$ adsorbed by the support. It should be noted that low $AlBr_3$ adsorption is desired for economic reasons.

Two samples of Porocel support of varying adsorbed water content were employed as supports for $AlBr_3$ in isomerization of $C_5/C_6$ naphtha. Hydrogen bromide was added as a catalyst promoter in these experiments and soluble $AlBr_3$ was added with the $C_5/C_6$ feed. The reaction conditions, feed rates, etc. were identical in the two runs. The activity of the $AlBr_3$-Porocel catalysts and the quantity of $AlBr_3$ adsorbed by the Porocel support in these experiments are shown in the following tabulation:

|  | Run A | Run B |
|---|---|---|
| Water Content of Porocel Supports, Wt. percent | 10 | 1 |
| $AlBr_3$ Adsorbed by Support, Wt. Percent on Support | 55.1 | 25.1 |
| Catalyst Activity, Percent i-$C_6$ Conversion in 24 Hours | 72 | 85 |
| Catalyst Activity, as K, n-$C_6$ Reaction Rate Constant | 0.176 | 0.512 |

As shown by this example, the lower water content of the support resulted in lower adsorption of $AlBr_3$ by the support and higher catalyst activity. The importance of low water content is thus apparent because unexpectedly higher conversion may be obtained with less aluminum bromide.

*Example III*

Porocel support which had been recovered from used AlBr₃-Porocel catalyst, after ammonia neutralization and water washing in the aforementioned manner, was dried at various temperatures by stripping with dry nitrogen until no water was evolved from the support. The results of these tests are shown below.

| Drying temperature, °F.: | Water content of Porocel support, wt. percent |
|---|---|
| 400 | 1.8 |
| 550 | 1.3 |
| 700 | 0.5 |
| 1000 | 0 |

As mentioned previously, low water content support is desirable for reuse in the process. Thus drying at temperatures of 600°–1000° F. are preferred over lower temperatures because the water content of the support is reduced to negligible amounts. Drying of the support at temperatures much above 1000° F. is undesirable due to deterioration in physical properties of the support and subsequent lowering of activity when the support is reused with AlBr₃ as a catalyst. This is illustrated in the next example.

*Example IV*

Porocel support was dried at various temperatures indicated below and then employed as the support for AlBr₃ in the isomerization of $C_5/C_6$ naphtha. Hydrogen bromide and soluble AlBr₃ was added with the feed. Identical feed rates, operating conditions, etc. were maintained in the three runs. Results of these experiments are tabulated below.

| Porocel Drying Conditions | Surface Area, m.²/gram | Activity for Isomerization K, Reaction Rate Constant |
|---|---|---|
| 16 Hours at 1,000° F | 114 | 1,557 |
| 16 Hours at 1,400° F | 90 | 0.954 |
| 16 Hours at 1,600° F | 47 | 0.709 |

It is apparent that employing heating temperatures above about 1000° F. adversely effects the support material and decreases quite noticeably its activity in the hydrocarbon conversion process.

Although the invention has been described in detail with regard to the use of aluminum bromide and Porocel, it will be understood that the invention is applicable wherein aluminum chloride is the active catalytic material. Furthermore, it will be understood that the invention is applicable where the support materials are bauxite, alumina, clays, or any other known support material.

The invention is also applicable when hydrogenating components, such as platinum, palladium, nickel and the like, are incorporated on the support at concentrations of 0.01 to 10 wt. percent. In many instances, it is desirable to add these hydrogenation components to the support prior to aluminum halide impregnation and to employ hydrogen in the isomerization reaction to lessen undesirable side reactions. This invention is also useful in recovery of support from catalysts comprising a Friedel-Crafts component, such as boron trifluoride impregnated alumina, silica-alumina or similar support material. In this case, also, a hydrogenating component, such as platinum, may be incorporated on the support for the purposes mentioned above.

What is claimed is:

1. A process for recovering the support from a spent mass of supported Friedel-Crafts catalyst which comprises contacting said spent mass in situ with anhydrous ammonia for a time sufficient to neutralize said spent catalyst mass, water washing said treated mass with at least 3 volumes of water per volume of catalyst support at a velocity of from about 0.2 to 0.5 ft./min. for a time sufficient to hydrolyze and remove from the support the ammoniated Friedel-Crafts catalyst, and drying said water-washed mass at a temperature within the range of about 600 to 1000° F.

2. The process of claim 1 wherein the water-washed mass is dried by passing a gas therethrough having a temperature in the range of about 600 to 1000° F.

3. A process for recovering the support from a spent mass of supported Friedel-Crafts catalyst which comprises contacting said spent mass in situ with anhydrous ammonia for a time sufficient to neutralize said spent catalyst mass, water washing said treated mass with at least 3 volumes of water per volume of catalyst support at a velocity of from about 0.2 to 0.5 ft./min. for a time sufficient to hydrolyze and remove from the support the ammoniated Friedel-Crafts catalyst, and drying said water-washed mass at a temperature within the range of about 600 to 1000° F. for a time sufficient to reduce the moisture content of the support to less than 10 wt. percent.

4. A process for recovering from a spent mass of supported aluminum halide catalyst in a reaction zone a support suitable for reuse with aluminum halide which comprises contacting said mass in situ in said reaction zone with a hydrocarbon to remove residual hydrogen halide, passing anhydrous ammonia into said zone to neutralize said spent catalyst, circulating naphtha during said neutralization step to control temperature, water washing said neutralized mass in said reaction zone at a water velocity in the range of about 0.2 to 0.5 ft./min., employing at least 3 volumes of wash water per volume of catalyst, drying said water washed mass in said reaction zone with a gas at a temperature within the range of about 600° to 1000° F., recovering a catalyst support containing no more than about 1.8% water, and reimpregnating said support with aluminum halide.

5. The process of claim 4 wherein said support is a calcined bauxite.

References Cited in the file of this patent

UNITED STATES PATENTS

| 2,323,830 | McMillan | July 6, 1943 |
| 3,026,176 | Tyson et al. | Mar. 20, 1962 |